(12) United States Patent
Hellberg

(10) Patent No.: US 11,230,222 B2
(45) Date of Patent: Jan. 25, 2022

(54) DEVICE FOR SUSPENSION OF A LAMP IN A VEHICLE

(71) Applicant: Ningbo Geely Automobile Research & Development Co., Ltd., Ningbo (CN)

(72) Inventor: Jan Hellberg, Marstrand (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 16/893,015

(22) Filed: Jun. 4, 2020

(65) Prior Publication Data

US 2020/0298745 A1    Sep. 24, 2020

Related U.S. Application Data

(63) Continuation of application No. PCT/CN2018/116706, filed on Nov. 21, 2018.

(30) Foreign Application Priority Data

Dec. 19, 2017  (EP) ..................................... 17208550

(51) Int. Cl.
*B60Q 1/04* (2006.01)
*B60R 21/34* (2011.01)

(52) U.S. Cl.
CPC ............ *B60Q 1/0491* (2013.01); *B60R 21/34* (2013.01); *B60R 2021/343* (2013.01)

(58) Field of Classification Search
CPC .............................. B60Q 1/0491; F21V 15/04
See application file for complete search history.

(56) References Cited

U.S. PATENT DOCUMENTS

| 3,284,100 | A | * | 11/1966 | Goff .......................... B60D 3/00 280/481 |
| 7,090,371 | B1 | | 8/2006 | Bonar |
| 2003/0142503 | A1 | | 7/2003 | Ericsson et al. |

(Continued)

FOREIGN PATENT DOCUMENTS

| CN | 101469820 A | 7/2009 |
| CN | 105291953 A | 2/2016 |

(Continued)

OTHER PUBLICATIONS

European Search Report from corresponding European Application No. 17208550.8, dated May 29, 2018, 3 pages.

(Continued)

*Primary Examiner* — Alexander K Garlen
*Assistant Examiner* — Eric T Eide
(74) *Attorney, Agent, or Firm* — Tucker Ellis LLP

(57) ABSTRACT

A device for suspension of a lamp in a vehicle. The device includes a guiding means for guiding a lamp to move relative to a vehicle from a first position to a second position in case of an impact between the lamp and an object. The device further includes at least one energy absorber for counteracting movement of the lamp from the first position to the second position. The guiding means is arranged for guiding the lamp to move downwardly in a movement direction having a movement direction component in parallel with the Z-axis while the movement of the lamp being counteracted by said energy absorber.

20 Claims, 7 Drawing Sheets

(56) References Cited

U.S. PATENT DOCUMENTS

| | | | | |
|---|---|---|---|---|
| 2004/0125584 A1* | 7/2004 | Arion | ................... | B60Q 1/0491 |
| | | | | 362/21 |
| 2007/0091624 A1* | 4/2007 | Takata | ................ | B60Q 1/0491 |
| | | | | 362/459 |
| 2007/0279925 A1 | 12/2007 | Jocher | | |
| 2014/0293638 A1* | 10/2014 | Krajenke | ............ | B60Q 1/0491 |
| | | | | 362/523 |

FOREIGN PATENT DOCUMENTS

| | | |
|---|---|---|
| DE | 2727517 A1 | 12/1978 |
| DE | 10030373 A1 | 1/2002 |
| EP | 1431116 B1 | 5/2006 |
| FR | 2844755 A1 | 3/2004 |
| FR | 2901202 A1 | 11/2007 |
| JP | H02127138 A | 5/1993 |
| JP | H11165581 A | 6/1999 |
| JP | 2000280816 A | 10/2000 |
| JP | 2005186738 A | 7/2005 |

OTHER PUBLICATIONS

International Search Report from corresponding International Application No. PCT/CN2018/116706, dated Feb. 27, 2019, 5 pages.

* cited by examiner

DEVICE FOR SUSPENSION OF A LAMP IN A VEHICLE

RELATED APPLICATION DATA

This application is a continuation of International Application No. PCT/CN2018/116706, filed Nov. 21, 2018, which claims the benefit of European Application No. 17208550.8, filed Dec. 19, 2017, the disclosures of which are incorporated herein by reference in their entireties.

TECHNICAL FIELD

The invention relates to a device for suspension of a lamp in a vehicle, and a vehicle comprising such a lamp suspension device.

BACKGROUND

During a collision of a vehicle with a pedestrian, the pedestrian often collides with the head on the hood and/or the fender of the vehicle. Further, any lamp arranged in the front of the vehicle may constitute a relative hard structure. To mitigate injuries to pedestrians, vehicles are usually adapted to yield in response to forces generated by a pedestrian impact. For example, the vehicle may be equipped with a pedestrian air bag or a device for changing the inclination angle of the hood, etc.

SUMMARY

An objective of the invention is to provide a device for suspension of a lamp in a vehicle, which device will reduce pedestrian injuries in case of a head impact to the lamp.

The objective is achieved by a device for suspension of a lamp in a vehicle, which device comprises a guiding means for guiding the lamp to move relative to the vehicle from a first position to a second position in case of an impact between the lamp and an object, and at least one energy absorber for counteracting movement of the lamp from the first position to the second position, wherein the guiding means is arranged for guiding the lamp to move downwardly in a movement direction having a movement direction component in parallel with the Z-axis while the movement of the lamp being counteracted by said energy absorber.

The invention is based on the insight that by such a device, energy can be absorbed during impact even if the space close to the lamp is limited, particularly for a lamp mounted on a position in the hood and/or the front wheel fender area where the lamp has a major part of an exterior surface facing upwardly with a surface normal having a major direction component in parallel with the Z-axis. This in turn will improve the pedestrian safety in case of an impact.

The directions and axes used herein, i.e. the X-axis, Y-axis and the Z-axis, constitute a cartesian coordinate system arranged relative to a vehicle such that the X-axis is in parallel with the horizontal longitudinal extension of the vehicle, the Y-axis is in parallel with the horizontal lateral extension of the vehicle, thus being perpendicular to the X-axis, and the Z-axis is in parallel with a vertical extension of the vehicle, thus being perpendicular to the X-axis and the Y-axis.

According to one embodiment, the guiding means is arranged for guiding the lamp to move such that the movement direction component in parallel with the Z-axis is larger than any movement direction component in parallel with the X-axis or Y-axis, and preferably the guiding means is arranged for guiding the lamp such that the movement direction of the lamp is substantially in parallel with the Z-axis. Hereby, the energy absorption in the Z-direction can be further improved.

According to another embodiment, the device comprises one said energy absorber for counteracting pivot motion of the lamp, and the guiding means is arranged for guiding the lamp to pivot about an axis being transverse relative to the Z-axis while the pivot motion of the lamp being counteracted by said energy absorber. Hereby, energy can be absorbed both during translation motion and pivot motion of the lamp. Although the distribution of the energy absorption on the translation motion and the pivot motion, respectively, may depend on the impact position and/or direction, the counterforce from the energy absorber acting against the movement in the Z-direction and the counter force or torque from the energy absorber acting against the pivot motion can be adapted to each other.

According to a further embodiment, the pivot axis is substantially perpendicular to the X-axis, and preferably the pivot axis extends in a direction substantially in parallel with the Y-axis. Hereby, the energy absorption can be further improved, since the orientation of the pivot axis relative an impact direction is often favourable.

According to a further embodiment, the guiding means is arranged for making the lamp pivotable about the pivot axis in a first pivot direction and a second pivot direction opposite to the first pivot direction. Herby, the ability of the lamp to pivot during energy absorption is less dependent on the impact position.

According to a further embodiment, the pivot axis is displaceable and arranged to move together with the lamp in the movement direction. Hereby, pivot motion is possible for various positions of the lamp. In addition, should the position of impact be very close to the pivot axis not causing any significant pivot motion, movement of the lamp with a movement direction component in parallel with the Z-axis while absorbing energy is still possible.

According to a further embodiment, said at least one energy absorber is arranged for counteracting both motion of the lamp in the movement direction and pivot motion about said pivot axis. Hereby, the energy absorption function can be achieved by means of relative few components.

According to a further embodiment, the device comprises one said energy absorber arranged on each side of the pivot axis. Hereby, an effective energy absorption can be provided independent on the pivot direction of the lamp.

According to a further embodiment, the guiding means is arranged for guiding the lamp to move downwardly in a movement direction having a major movement direction component in parallel with the Z-axis while the movement of the lamp being counteracted by one said energy absorber, or to move inwardly in a movement direction having a major movement direction component in parallel with the X-axis while the movement of the lamp being counteracted by one said energy absorber, depending on the impact position and direction. Hereby, the device enables movement of the lamp during energy absorption even in case of an unfavourable impact position and/or direction forcing the lamp in a direction without any significant component in parallel with the Z-axis.

According to another aspect of the invention, a further objective is to provide an arrangement for suspension of a lamp in a vehicle, which arrangement can reduce pedestrian injuries in case of a head impact to the lamp and be easily mounted to a vehicle.

This objective is achieved by an arrangement for suspension of a lamp in a vehicle, wherein the arrangement has a guiding means for guiding the lamp to move relative to a vehicle from a first position to a second position in case of an impact between the lamp and an object, the guiding means comprises at least one flange unit for receiving the lamp, and the arrangement further has at least one holder for holding an energy absorber for counteracting movement of the lamp from the first position to the second position, and wherein said at least one flange unit and said at least one holder are integrated in one single unit attachable to the vehicle.

According to a further aspect of the invention, a further objective is to provide a vehicle, which vehicle will reduce pedestrian injuries in case of a head impact to a vehicle lamp. This objective is achieved by a vehicle provided with a device according to the invention.

The advantages of the vehicle are the same as the advantages already discussed hereinabove with reference to the embodiments of the device and the arrangement.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS

Figure 1A:
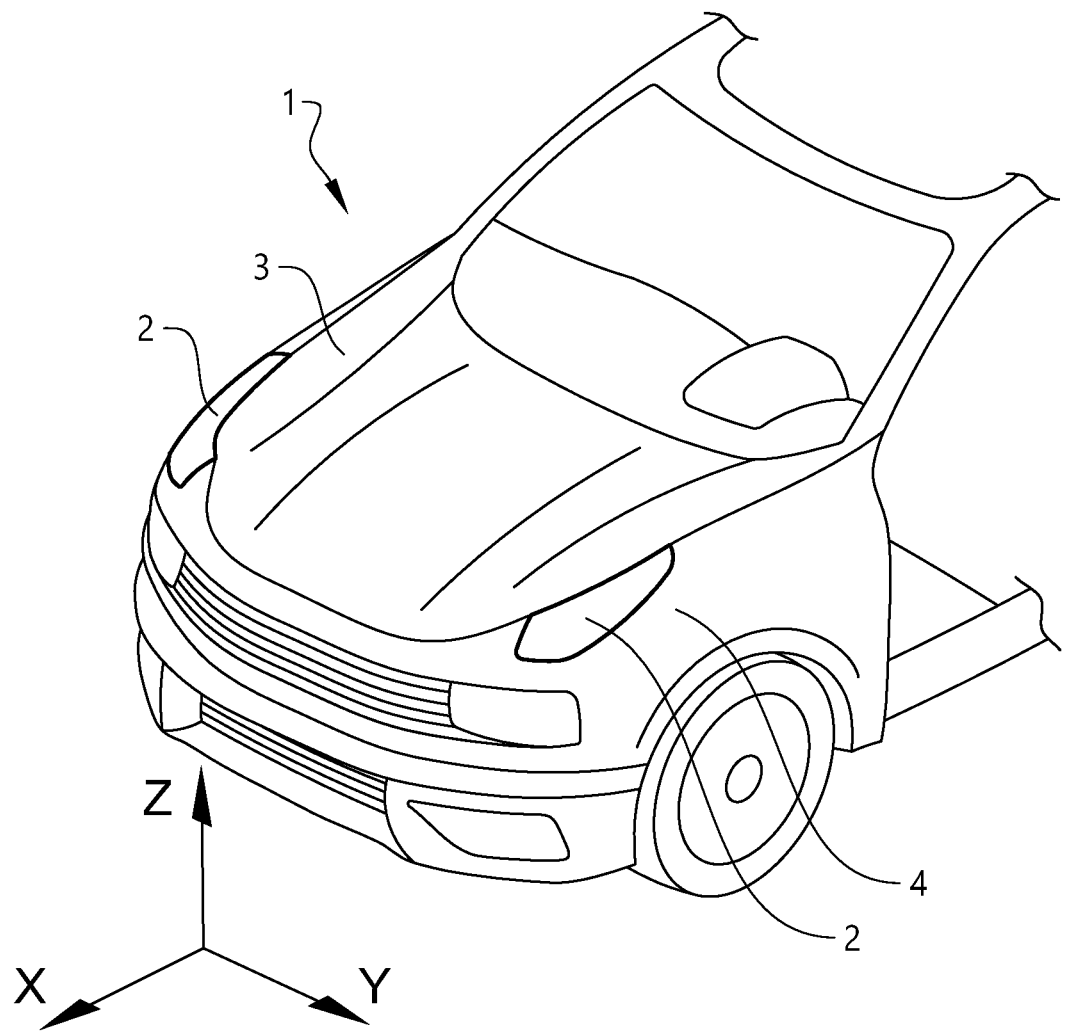
FIG. 1A is a perspective front view of a vehicle.
Figure 1B:
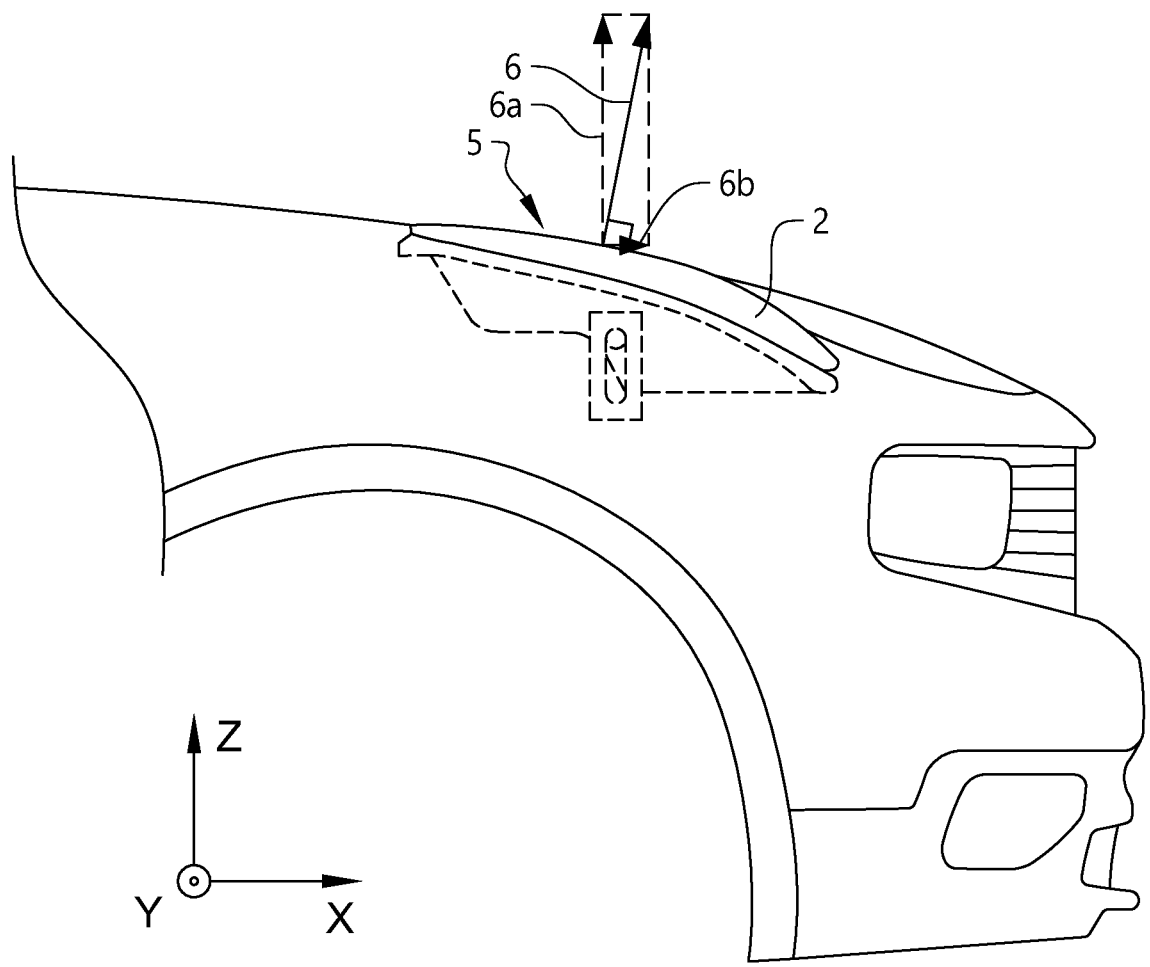
FIG. 1B is a side view of the vehicle illustrated in FIG. 1A.

FIG. 1A is a perspective view of a vehicle 1 and FIG. 1B shows the vehicle 1 in a side view. A cartesian coordinate system having axes X, Y and Z is also shown. The vehicle 1 and the individual components will be described herein with reference to this coordinate system. The vehicle 1 has two supplement lamps 2 for daytime running light (DRL) arranged in the hood and front wheel fender area of the vehicle 1. One such lamp 2 is arranged on the left side of the vehicle 1 at the boundary between the hood 3 and the adjacent front wheel fender 4. In the same way the other lamp 2 is arranged on the right side of the vehicle.

As can be seen in FIG. 1B, the lamp 2 can be arranged such that a major part of an exterior surface 5 of the lamp faces upwardly with a surface normal 6 having a major direction component 6a in parallel with the Z-axis. This does not necessarily mean that the surface of the lamp is completely horizontal. In FIG. 1B, where the lamp 2 on the right side of the vehicle 1 is illustrated, the lamp 2 is somewhat inclined relative to the X-axis, but the surface normal 6 of the lamp 2 has a larger component 6a in a direction in parallel with the Z-axis than a component 6b in a direction in parallel with the X-axis. The surface 5 can also be somewhat inclined relative to the Y-axis.

For example, the exterior surface 5 of the lamp can be inclined relative to the X-axis with an angle α selected in the range $0 \leq \alpha < 45°$, preferably $0 \leq \alpha \leq 30°$, and relative to the Y-axis with an angle β selected in the range $0 \leq \beta < 45°$, preferably $0 \leq \beta \leq 30°$. If the lamp 2 is inclined relative to the X-axis, preferably the rear part of the exterior surface of the lamp is arranged at a higher level than the front part of the exterior surface of the lamp 2, and if the lamp 2 is inclined relative to the Y-axis, preferably the inner part of the exterior surface of the lamp 2 is arranged at a higher level than the outer part of the exterior surface of the lamp 2.

Although the exterior surface of the lamp does not need to be horizontal, preferably the projected surface of the lamp seen in a direction in parallel with the Z-axis has however a considerable area that could be subject to an impact with an object.

Further, the lamp 2 is suitably arranged such that an exterior surface 5 of the lamp is substantially flush with an exterior surface of the hood 3 and the front wheel fender 4 of the vehicle 1.

The lamp 2 is suspended in the vehicle 1 by means of a vehicle lamp suspension device 7 that will be described in detail hereinbelow.

Figure 2:
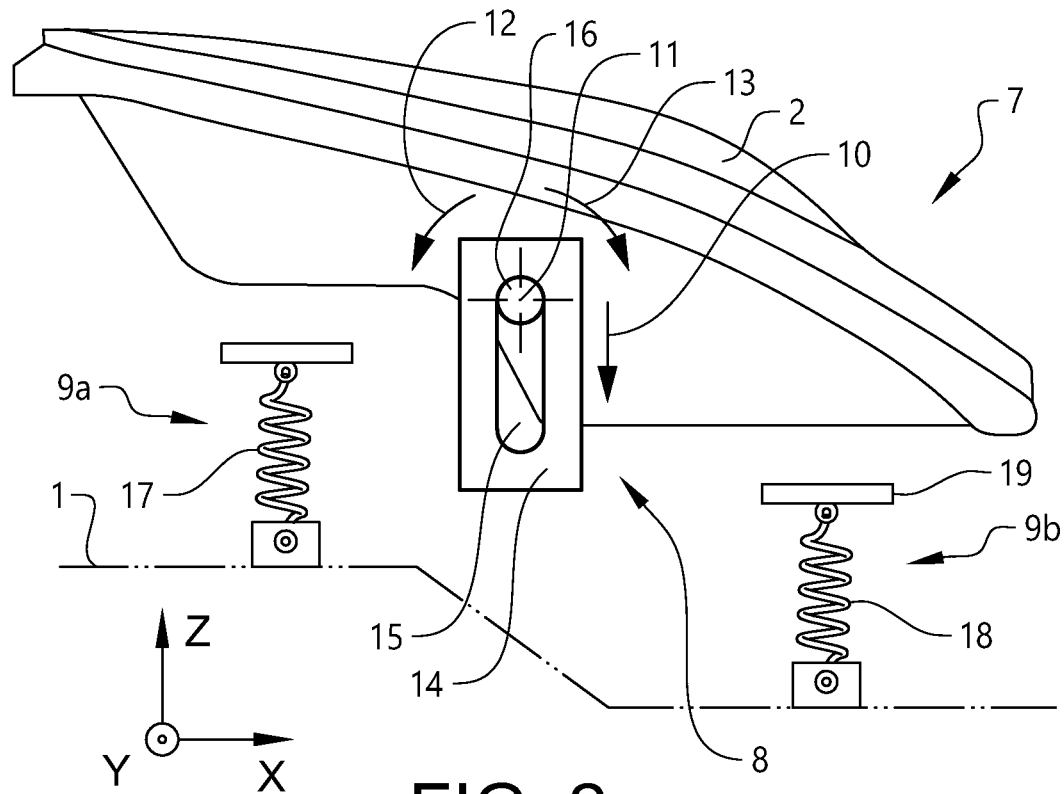
FIG. 2 is side view of one embodiment of a device for suspension of a lamp in a vehicle and a lamp seen in a direction in parallel to the Y-axis.

FIG. 2 shows a device 7 for suspension of the lamp 2 in the vehicle 1. The device 7 comprises a guiding means 8 for guiding the lamp 2 to move relative to the vehicle 1 from a first position to a second position in case of an impact between the lamp and an object. The device 7 also comprises at least one energy absorber 9a, 9b for counteracting movement of the lamp from the first position to the second position. The guiding means 8 is arranged for guiding the lamp 2 to move downwardly in a movement direction 10 having a movement direction component in parallel with the Z-axis while the movement of the lamp 2 being counteracted by one said energy absorber 9a, 9b. The guiding means 8 is suitably arranged for guiding the lamp 2 to move such that the movement direction component in parallel with the Z-axis is larger than any movement direction component in parallel with the X-axis or Y-axis, and preferably such that the movement direction 10 of the lamp is substantially in parallel with the Z-axis.

The expression "movement direction" used herein refers to the resulting translation motion direction, whereas "movement direction component" is a component contributing to the "movement direction".

Although in the example embodiment illustrated in FIG. 2, the lamp 2 is guided by the guiding means 8 in a substantially vertical direction only, in other embodiments of the device 7 the guiding means could however be arranged for guiding the lamp such that the movement direction has a movement direction component also in parallel with the X-axis and/or the Y-axis while the lamp being guided to move downwards with a movement direction component in parallel with the Z-axis.

One or more energy absorbers 9a, 9b can be used. The energy absorber 9a, 9b can be any kind of metal spring, foam, plastic component, etc., that preferably has a non-linear spring constant. By such an energy absorber having a spring constant that increases with the movement of the lamp from the first position towards the second position, energy can be absorbed in an efficient way. For example, a spring can have a non-linear spring constant increasing with increased compression of the spring.

Further, the lamp suspension device 7 or any other part of the vehicle 1 may comprise an attachment component for mechanical connection of the lamp 2 to the vehicle 1. Such an attachment component can be used for connecting the lamp to the vehicle and keeping the lamp in an intended position, for example the first position mentioned above, in absence of any impact. In such a case, the lamp is releasable from this connection to the vehicle in case of an impact. The lamp has preferably a break off feature withstanding static loads. For example, such an attachment component can be broken in case of an impact and thereafter the movement of the lamp during impact is mainly determined by the guiding means and the energy absorber. Optionally, the guiding means can be used also for connecting the lamp to the vehicle and keeping the lamp in the intended first position.

The suspension device 7 may comprise one said energy absorber 9a, 9b for counteracting pivot motion of the lamp 2. In addition to the movement downwards, the guiding means 8 is suitably arranged for guiding the lamp 2 to pivot about an axis 11 being transverse relative to the Z-axis while the pivot motion of the lamp 2 being counteracted by said energy absorber 9a, 9b. By "transverse" is meant a direction that can deviate from a direction perpendicular to the Z-axis. The deviation can be within ±30°, preferably ±20° and often within ±10° from a direction perpendicular to the Z-axis. In the example embodiment illustrated in FIG. 2, the pivot axis 11 is arranged substantially perpendicular to the X-axis and the Z-axis. Thus, the pivot axis 11 is arranged to extend in a direction substantially in parallel with the Y-axis for pivoting of the lamp 2 in case of an impact.

The guiding means 8 is suitably arranged for making the lamp 2 pivotable about the pivot axis 11 in a first pivot direction 12 and a second pivot direction 13 opposite to the first pivot direction 12.

Further, the pivot axis 11 can also be displaceable and arranged to move together with the lamp 2 in the movement direction 10. Thus, in the example embodiment illustrated in FIG. 2, the pivot axis 11 is moved downwards in the vertical direction when the lamp 2 is moved downwards during impact.

For achieving this function, the guiding means 8 can comprise at least one flange unit 14 having a slot 15 for receiving a pin 16. The slot 15 is arranged for guiding the pin 16 to move in the movement direction 10, here in the vertical direction, and pivot about the pivot axis 11 relative to the flange unit 14. Although the flange unit 14 is suitably adapted to be attached to the vehicle 1 and receive the pin 16 which is arranged on the lamp 2, it would also be possible to instead arrange the pin to be fixed relative to the vehicle and arrange the slot in the lamp.

Figure 3:
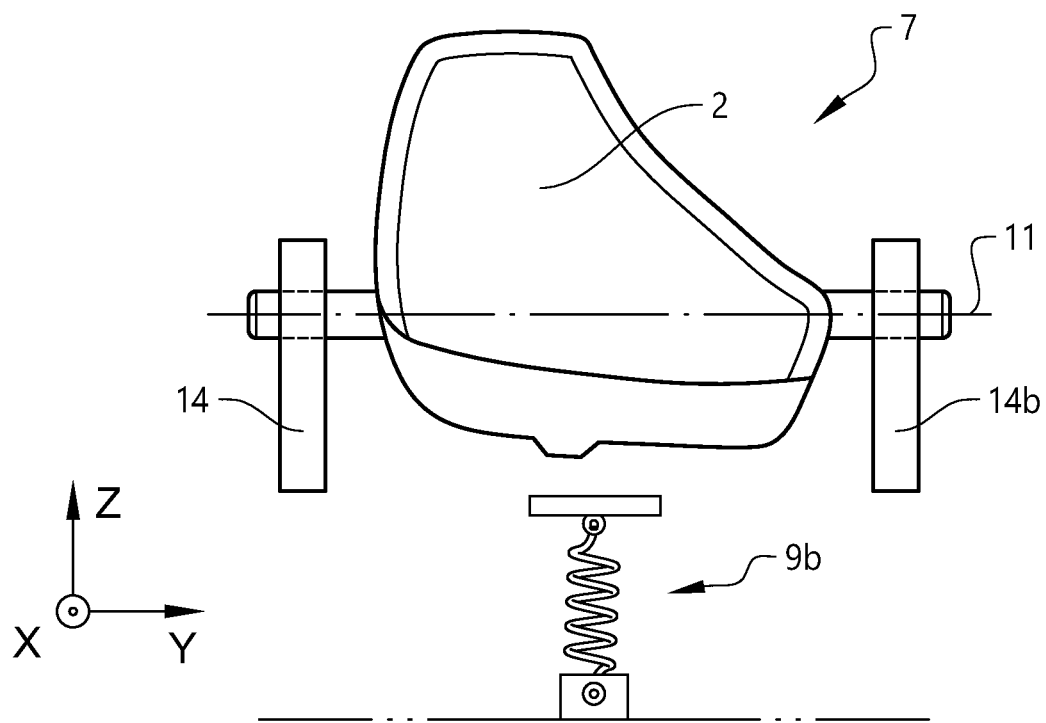
FIG. 3 is a front view of the device illustrated in FIG. 2.

As illustrated in FIG. 3 which is a front view of the vehicle lamp suspension device 7 and the lamp 2 illustrated in FIG. 2, the device 7 may comprise two said flange units 14, 14b spaced apart with a distance along the pivot axis 11. The distance is suitably adapted for accommodating the lamp 2 between the two flange units 14, 14b.

Each energy absorber 9a, 9b can be arranged for counteracting translation motion or pivot motion of the lamp 2. With reference to FIG. 2, one and the same energy absorber 9a, 9b is arranged for counteracting both movement of the lamp 2 in the movement direction 10 and pivot motion about the pivot axis 11. The vehicle lamp suspension device 7 illustrated in FIG. 2 has a first energy absorber 9a including a first spring 17 and a second energy absorber 9b including a second spring 18. The first energy absorber 9a is arranged on a first side of the pivot axis 11 and the second energy absorber 9b is arranged on a second side of the pivot axis 11. These energy absorbers 9a, 9b will counteract motion of the lamp 2 in the vertical direction, but also counteract pivot motion about the pivot axis 11, since each energy absorber 9a, 9b is arranged at a distance from the pivot axis 11 with respect to the position along the X-axis. The first energy absorber 9a and the second energy absorber 9b are suitably attached to the vehicle 1. In FIG. 2, the first spring 17 and the second spring 18 are pivotally attached to the vehicle. The upper end of each spring 17, 18 can be attached to an intermediate plate 19 to be in contact with the lamp 2 when the spring is compressed by the lamp 2.

Although an energy absorber in form of a spring arranged such as the first and second energy absorbers 9a, 9b in FIG. 2, will create a counterforce only when the lamp causing the spring to be compressed, in another example embodiment the energy absorber could be arranged for providing a counterforce when the energy absorber is stretched. For example, a first end of the spring can be attached to the vehicle and a second end of the spring can be attached to the lamp.

Figure 4:
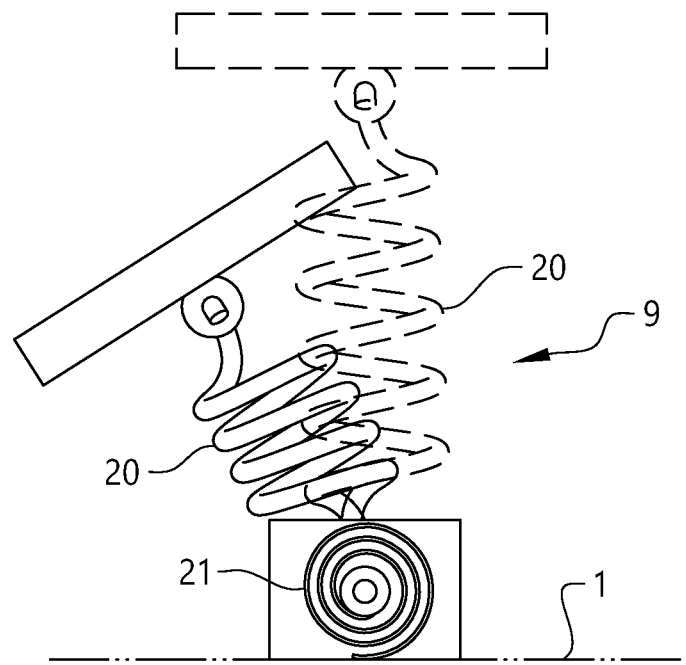
FIG. 4 is a variant of an energy absorber.

FIG. 4 shows a variant of an energy absorber 9. The energy absorber 9 comprises two springs 20, 21. A compression spring 20 is arranged to provide a counterforce in the compression direction of the spring 20. Further, the compression spring 20 is arranged at the vehicle 1 for allowing the compression spring 20 to pivot relative to the vehicle 1. A further spring (schematically illustrated) 21 is arranged to extend between the vehicle 1 and the compression spring 20, which further spring 21 counteracts pivot motion of the compression spring 20. Thus, the compression spring 20 is pivotable about its attachment point to the vehicle 1 while such pivot motion is counteracted by the further spring 21. FIG. 4 shows a first state where the compression spring 20 is not loaded (dotted lines) and a second state where the compression spring 20 has been compressed and pivoted relative to the vehicle 1.

Optionally, absorption of energy during pivoting of the lamp can be provided by an energy absorber (not shown) that is arranged at the pivot axis. For example, a spring arranged to extend between the pin and a vehicle part, such as the flange unit, can be used. The spring will counteract pivot motion of the pin, and thus the lamp, relative to the vehicle part.

Figure 5:
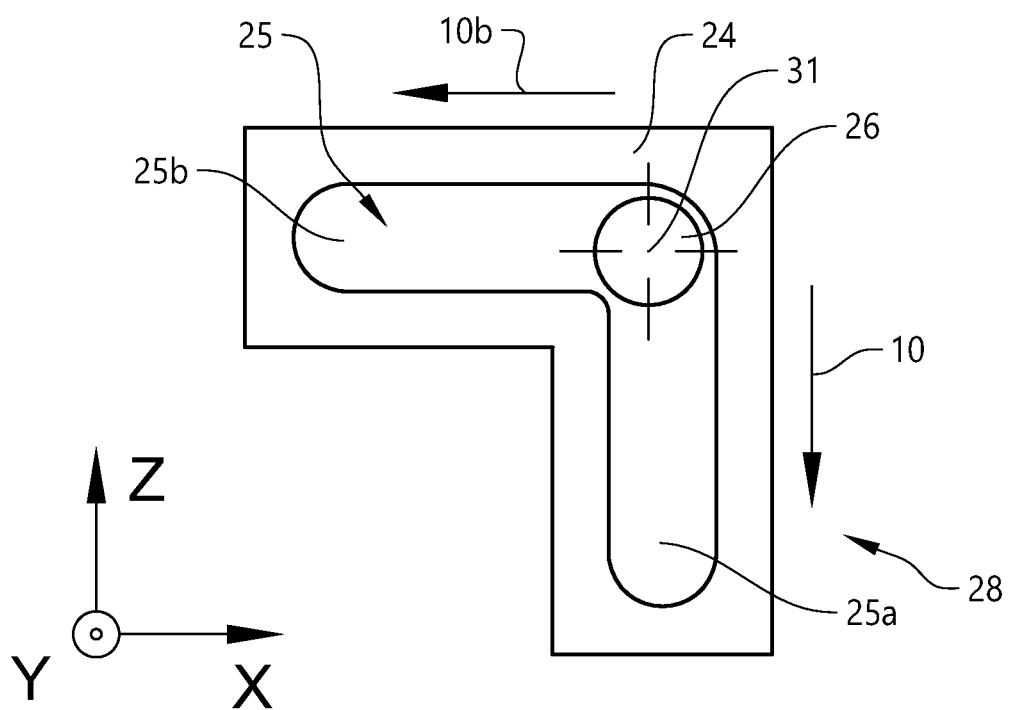
FIG. 5 is a variant of a flange unit of a guiding means.

FIG. 5 shows a variant of a guiding means 28. The guiding means 28 is arranged for guiding the lamp to move downwardly in a movement direction 10 having a major movement direction component in parallel with the Z-axis while the movement of the lamp being counteracted by an energy absorber, or to move inwardly in a movement direction 10b having a major movement direction component in parallel with the X-axis while the movement of the lamp being counteracted by an energy absorber, depending on the impact position and direction. Thus, for various positions or directions of impact, the guiding means 28 is arranged for guiding the lamp in different directions 10, 10b.

In the example embodiment illustrated in FIG. 5, the guiding means 28 comprises a flange unit 24 having a slot 25 with a first slot part 25a and a second slot part 25b for receiving a pin 26. The first slot part 25a and the second slot part 25b are arranged with different extension directions for providing alternative guiding directions for the pin 26. The first slot part 25a is arranged for guiding the pin 26 to move in a direction 10 substantially in parallel with the Z-axis and pivot about the pivot axis 31 relative to the flange unit 24. The second slot part 25b is arranged for guiding the pin 26 to move in a direction substantially in parallel with the X-axis and pivot about the pivot axis 31 relative to the flange unit 24.

Figure 6A:
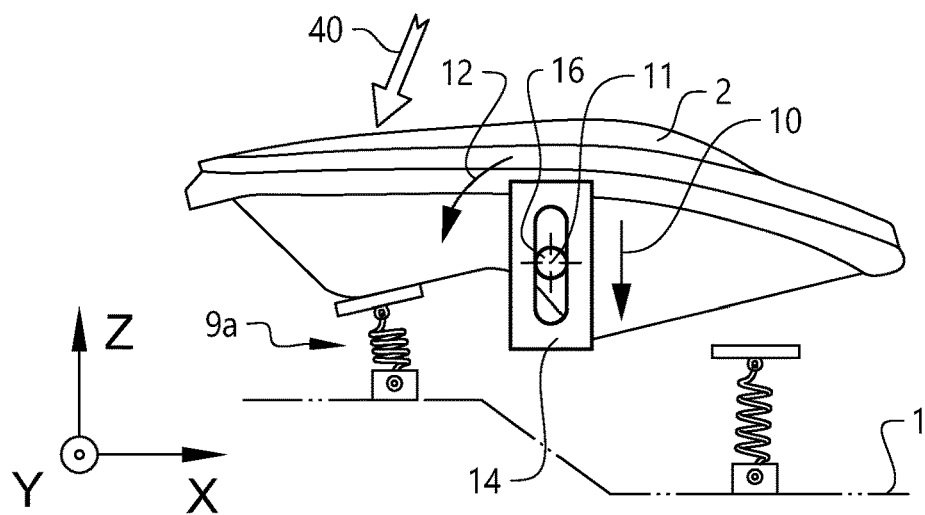
FIG. 6A shows the lamp in FIG. 2 in case of an impact in the rear part of the lamp.
Figure 6B:
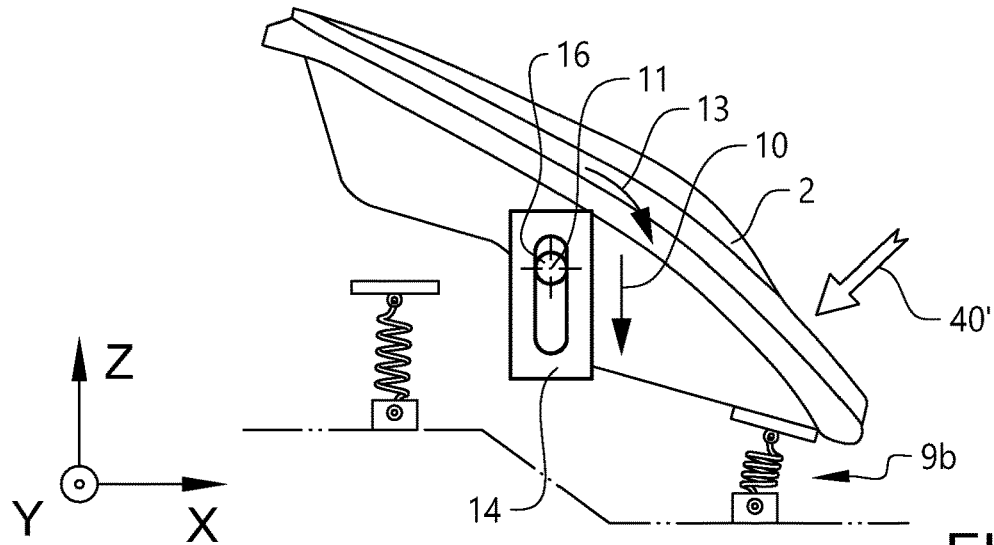
FIG. 6B shows the lamp in FIG. 2 in case of an impact in the front part of the lamp.
Figure 6C:
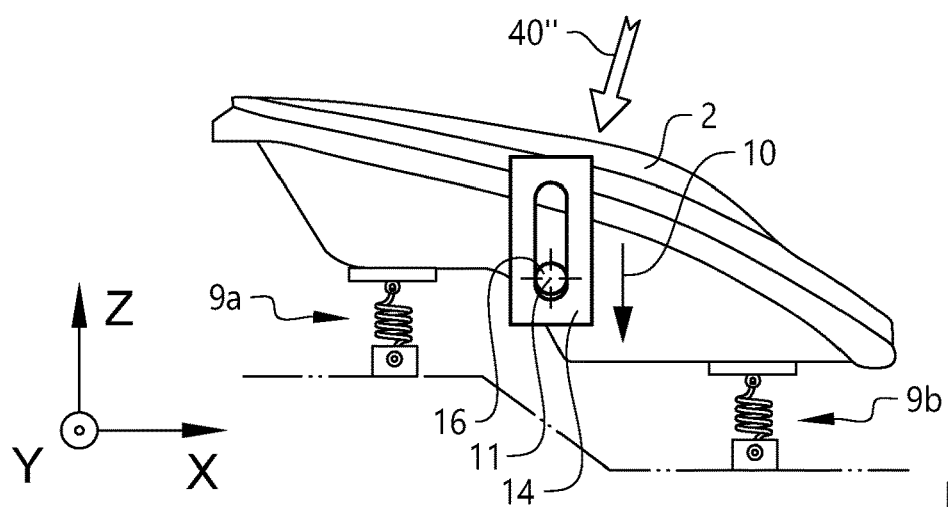
FIG. 6C shows the lamp in FIG. 2 in case of an impact in the centre part of the lamp.

FIGS. 6a, 6b and 6c show some examples of movement of the lamp 2 from the first position to the second position due to an impact between the lamp 2 and an object 40. In this context, the expressions rear part, front part and centre part of the lamp are used with respect to the position along the X-axis.

FIG. 6A shows the lamp 2 where the lamp has moved from the first position (see FIG. 2) to the second position due to an impact with an object 40. The lamp 2 has been hit by the object 40 in a rear part of the lamp 2 causing the lamp to pivot about the pivot axis 11 in a first pivot direction 12 and move downwards in the vertical direction 10. Energy of the impact is absorbed by the first energy absorber 9a that is compressed during the movement of the lamp from the first position to the second position. The flange unit 14 is fixed relative to the vehicle 1.

FIG. 6B shows the lamp 2 where the lamp has moved from the first position (see FIG. 2) to the second position due to an impact with an object 40'. The lamp 2 has been hit by the object 40' in a front part of the lamp 2 causing the lamp to pivot about the pivot axis 11 in a second pivot direction 13 and move downwards in the vertical direction 10. Energy of the impact is absorbed by the second energy absorber 9b that is compressed during the movement of the lamp from the first position to the second position. The flange unit 14 is fixed relative to the vehicle 1.

FIG. 6C shows the lamp 2 where the lamp has moved from the first position (see FIG. 2) to the second position due to an impact with an object 40". The lamp has been hit by the object 40" in a centre part of the lamp 2 causing the lamp to move downwards in the vertical direction 10. The pivot motion about the pivot axis 11 is almost negligible. Energy of the impact is absorbed by the first energy absorber 9a and the second energy absorber 9b that are compressed during the movement of the lamp from the first position to the second position. The flange unit 14 is fixed relative to the vehicle 1.

Figure 7:
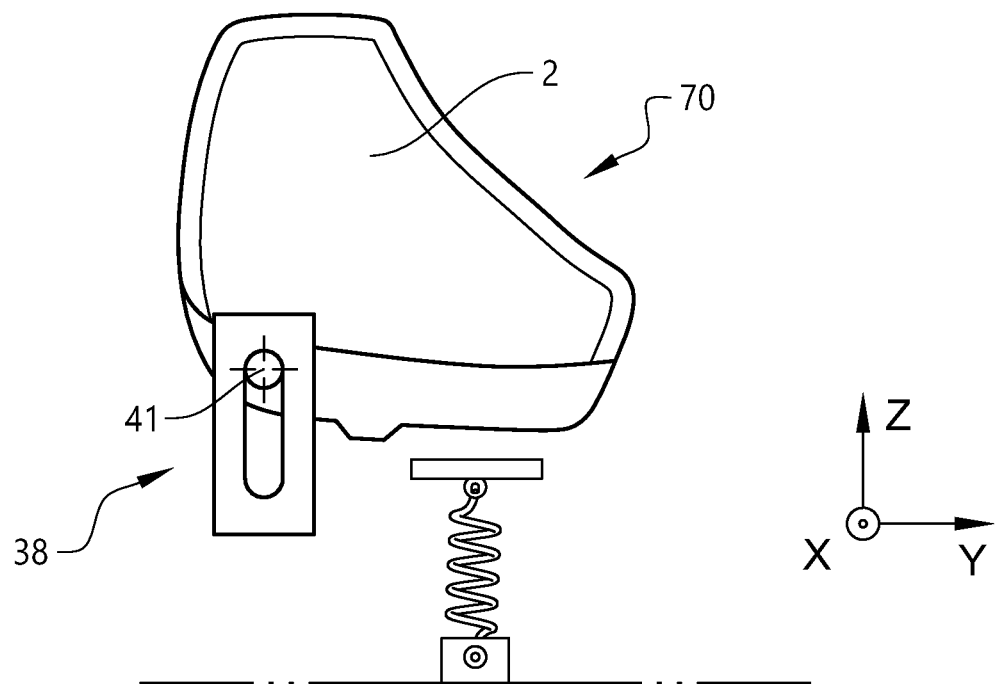
FIG. 7 is a front view of a variant of a device for suspension of a lamp in a vehicle seen in a direction in parallel to the X-axis.

FIG. 7 is a front view of a variant of a vehicle lamp suspension device 70 seen in a direction in parallel to the X-axis. The device 70 has a guiding means 38 arranged for guiding the lamp 2 to pivot about an axis 41 that is substantially perpendicular to the Y-axis. Further, the pivot axis 41 suitably extends in a direction substantially in parallel with the X-axis.

Figure 8:
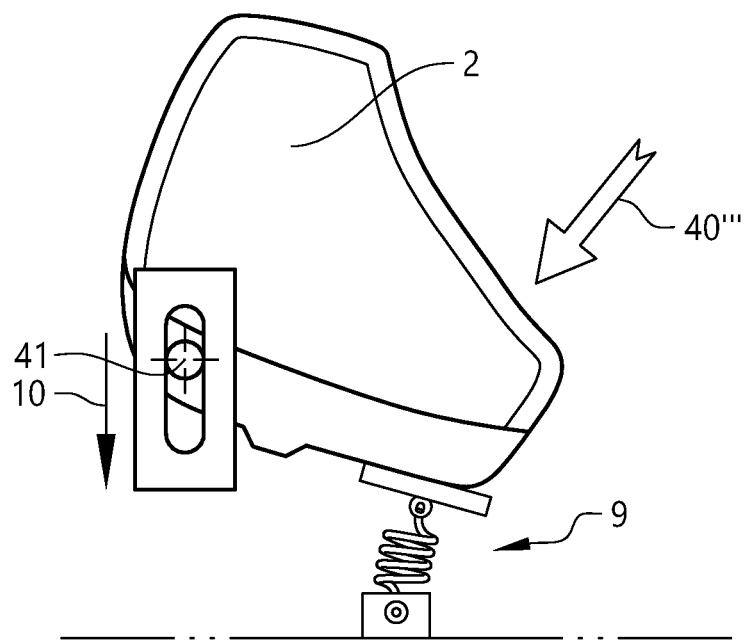
FIG. 8 shows the lamp illustrated in FIG. 7 in case of an impact.

FIG. 8 shows an example of movement of the lamp from the first position to the second position due to an impact between the lamp 2 and an object 40'". The lamp 2 has moved from the first position (see FIG. 7) to the second position due to an impact with an object 40'". The lamp 2 has been hit by the object causing the lamp to pivot about the pivot axis 41 and move downwards in the vertical direction 10. Energy of the impact is absorbed by the energy absorber 9 that is compressed during the movement of the lamp from the first position to the second position.

Figure 9:
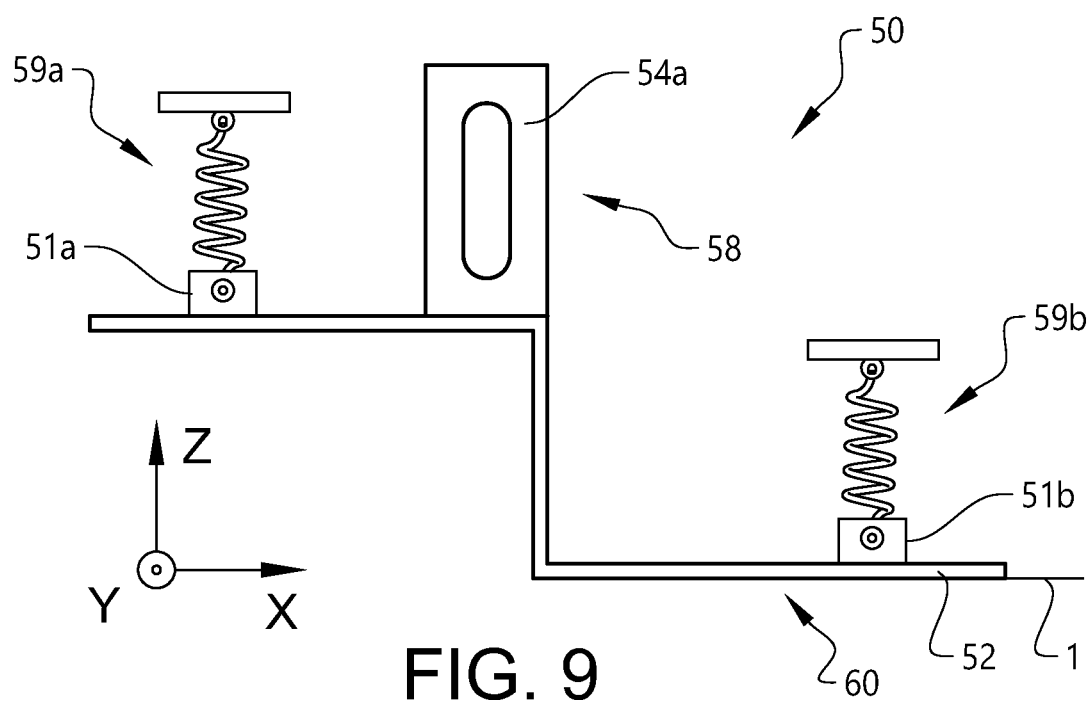
FIG. 9 is a side view of one embodiment of an arrangement for suspension of a lamp in a vehicle seen in a direction in parallel to the Y-axis.
Figure 10:
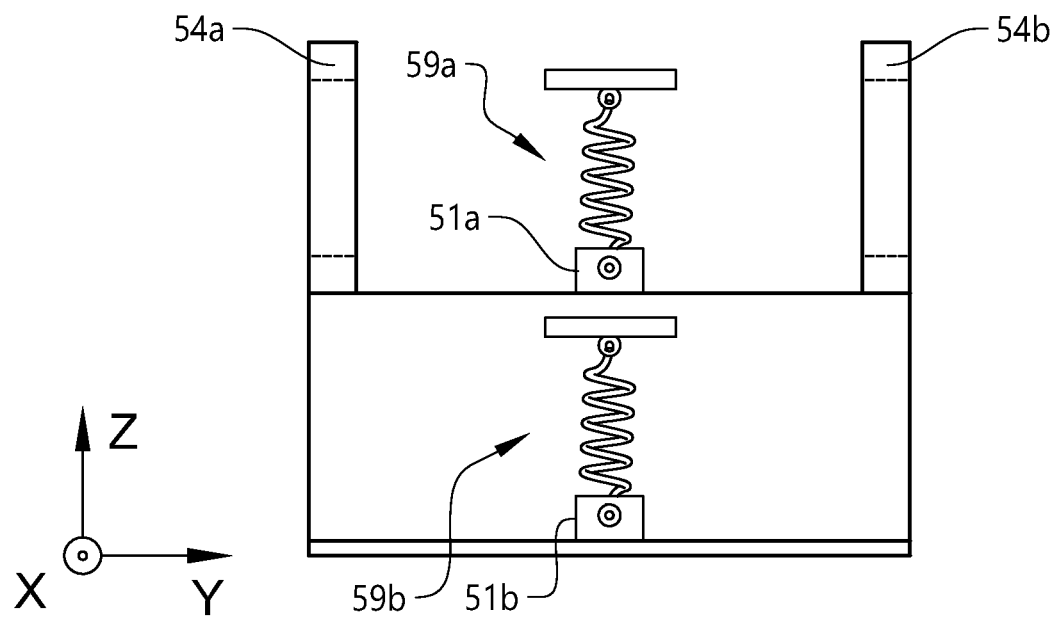
FIG. 10 is a front view of the arrangement illustrated in FIG. 9.

FIGS. 9 and 10 show an arrangement 50 for suspension of a lamp 2 in a vehicle 1. FIG. 9 is a side view and FIG. 10 is a front view of the arrangement. The arrangement 50 has a guiding means 58 for guiding a lamp (not shown) to move relative to a vehicle 1 from a first position to a second position in case of an impact between the lamp and an object. The guiding means 58 has at least one flange unit 54a for receiving the lamp. Further, the arrangement has at least one holder 51a, 51b for holding an energy absorber 59a, 59b for counteracting movement of the lamp from the first position to the second position. Said at least one flange unit 54a and said at least one holder 51a, 51b are integrated in one single unit 60 attachable to the vehicle 1. In the example embodiment illustrated in FIGS. 9 and 10, the guiding means 58 comprising two flange units 54a, 54b spaced apart from each other for receiving the lamp, and a first holder 51a for holding a first energy absorber 59a and a second holder 51b for holding a second energy absorber 59b. The arrangement 50 further comprises a plate 52 which can be attached to the vehicle 1. The two flange units 54a, 54b and the first and second holders 51a, 51b are attached to the plate 52 to be integrated in one and the same unit 60. This unit 60 is in turn attachable to the vehicle 1 by for example a bolted joint, welding or any other suitable means. Optionally, the flange units and the holders are made in one piece.

As regards features related to the guiding means and the energy absorbers of the arrangement 50 reference is also made to the description hereinabove for the example embodiments of the vehicle lamp suspension device 7, since the same features can be applied for the arrangement and the device.

It is to be understood that the present invention is not limited to the embodiments described above and illustrated in the drawings; rather, the skilled person will recognize that many changes and modifications may be made within the scope of the appended claims.

The invention claimed is:

1. A vehicle comprising:
   a lamp arranged in a hood and/or a front wheel fender area of the vehicle; and
   a suspension for the lamp comprising:
      a guiding means for guiding the lamp to move relative to the vehicle from a first position to a second position in case of an impact between the lamp and an object, and
      at least one energy absorber for counteracting movement of the lamp from the first position to the second position,
      wherein the guiding means is arranged for guiding the lamp to move downwardly in a movement direction having a movement direction component parallel with a Z axis while the movement of the lamp being counteracted by said energy absorber, and
      wherein the guiding means comprises at least one flange unit having a slot for receiving a pin, the slot being arranged for guiding the pin to move relative to the flange unit in said movement direction.

2. The vehicle according to claim 1, wherein the guiding means is arranged for guiding the lamp to move such that the movement direction component parallel with the Z-axis is larger than any movement direction component parallel with an X axis or a Y-axis.

3. The vehicle according to claim 2, wherein the guiding means is arranged for guiding the lamp such that the movement direction of the lamp is parallel with the Z-axis.

4. The vehicle according to claim 1, wherein the device comprises one said energy absorber for counteracting pivot motion of the lamp, and the guiding means is arranged for guiding the lamp to pivot about an axis being transverse relative to the Z-axis while the pivot motion of the lamp being counteracted by said energy absorber for counteracting pivot motion.

5. The vehicle according to claim 4, wherein the pivot axis is perpendicular to the Z-axis.

6. The vehicle according to claim 4, wherein the pivot axis is perpendicular to an X axis.

7. The vehicle according to claim 4, wherein the pivot axis extends in a direction in parallel with a Y axis.

8. The vehicle according to claim 4, wherein the pivot axis extends in a direction parallel with a X axis.

9. The vehicle according to claim 4, wherein the guiding means is arranged for making the lamp pivotable about the pivot axis in a first pivot direction and a second pivot direction opposite to the first pivot direction.

10. The vehicle according to claim 4, wherein the pivot axis is displaceable and arranged to move together with the lamp in said movement direction.

11. The vehicle according to claim 4, wherein said at least one energy absorber is arranged for counteracting both motion of the lamp in said movement direction and pivot motion about said pivot axis.

12. The vehicle according to claim 4, wherein the device comprises one said energy absorber arranged on each side of the pivot axis.

13. The vehicle according to claim 4, wherein the slot is arranged for making the pin pivotable about the pivot axis relative to the flange unit.

14. The vehicle according to claim 1, wherein the flange unit is attached to the vehicle and receives the pin being arranged on the lamp.

15. The vehicle according to claim 4, wherein the device comprises two said flange units spaced apart with a distance along the pivot axis.

16. The vehicle according to claim 15, wherein said distance is adapted for accommodating the lamp between the two flange units.

17. The vehicle according to claim 1, wherein the guiding means is arranged for guiding the lamp to move in one of the movement direction having the movement direction component parallel with the Z-axis while the movement of the lamp being counteracted by one said energy absorber or inwardly in an alternative movement direction having a major movement direction component in parallel with a X axis while the movement of the lamp being counteracted by one said energy absorber, depending on the impact position and direction.

18. The vehicle according to claim 1, wherein the lamp is arranged at a boundary between the hood and the front wheel fender of the vehicle.

19. The vehicle according to claim 1, wherein a major part of an exterior surface of the lamp faces upwardly with a surface normal having a major direction component parallel with the Z-axis.

20. The vehicle according to claim 1, wherein of-the lamp is flush with an exterior surface of the hood and/or the front wheel fender of the vehicle.

* * * * *